United States Patent
Chen et al.

(10) Patent No.: US 6,820,513 B1
(45) Date of Patent: Nov. 23, 2004

(54) REVERSE GEAR DEVICE OF A COMBINED VARIABLE TRANSMISSION SYSTEM

(76) Inventors: Yao-Yu Chen, No. 7, Lane 137, Yung Hsi Road, Yung Ching Hsiang, Chang Hua Hsien (TW); Jui-Chi Wu, No. 8, Lane 61, Jen Ai 1 Road, She To Hsiang, Chang Hua Hsien (TW)

( * ) Notice: Subject to any disclaimer, the term of this patent is extended or adjusted under 35 U.S.C. 154(b) by 0 days.

(21) Appl. No.: 10/307,568

(22) Filed: Dec. 2, 2002

(51) Int. Cl.⁷ ............................................. F16H 3/22
(52) U.S. Cl. ........................... 74/347; 74/355; 74/379
(58) Field of Search .................. 74/347, 335, 378, 74/355, 379, 376

(56) References Cited

U.S. PATENT DOCUMENTS

| | | | | |
|---|---|---|---|---|
| 510,218 A | * | 12/1893 | Ward ............................. | 192/21 |
| 620,735 A | * | 3/1899 | Cashmore ..................... | 74/379 |
| 851,448 A | * | 4/1907 | Smith ............................. | 74/379 |
| 1,394,373 A | * | 10/1921 | Tellefsen ....................... | 74/355 |
| 1,431,642 A | * | 10/1922 | Farrar et al. .................. | 192/60 |
| 1,704,896 A | * | 3/1929 | Kizziar ......................... | 475/109 |
| 2,640,397 A | * | 6/1953 | Miller ........................... | 409/34 |
| 2,992,566 A | * | 7/1961 | Wesley ........................... | 74/355 |
| 3,662,612 A | * | 5/1972 | Lassanske ..................... | 74/355 |
| 4,545,455 A | * | 10/1985 | Kanemura et al. ........... | 180/197 |
| 4,735,105 A | * | 4/1988 | Kumazawa .................... | 74/378 |
| 5,394,764 A | * | 3/1995 | Fini, Jr. ......................... | 74/378 |
| 6,182,784 B1 | * | 2/2001 | Pestotnik ...................... | 180/376 |

FOREIGN PATENT DOCUMENTS

CN          1315266 A    * 10/2001      ........... B60K/23/00

* cited by examiner

Primary Examiner—Tisha Lewis
(74) Attorney, Agent, or Firm—Alan D. Kamrath; Nikolai & Mersereau, P.A.

(57) ABSTRACT

A reverse gear device of a combined variable transmission system includes a housing which is mounted on the rear wheel axle of a motor scooter for housing a drive bevel gear, a driven bevel gear, an idle bevel gear, an idle gear shaft, shifting forks, and a sector plate cam. The drive bevel gear and the driven bevel gear are identical in specification to each other and are mounted at two sides of the rear wheel axle on the basis of a toothed cone center. The drive bevel gear and the driven bevel gear are provided with a groove facing the toothed cone center. The drive bevel gear is disposed with the axle by a spline hole. The driven bevel gear is disposed with the axle by a round hole for the power transmission in the forward motion.

1 Claim, 7 Drawing Sheets

REVERSE GEAR DEVICE OF A COMBINED VARIABLE TRANSMISSION SYSTEM

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a combined variable transmission (C.V.T.) system of a beach motor scooter, or three-wheeled motor scooter for the physically-handicapped person, and more particularly to a reverse gear device of the combined variable transmission system.

BACKGROUND OF THE INVENTION

The conventional reverse gear device of the three-wheeled motor scooter is similar in design to that of the automobile and is formed of a plurality of shafts and gears. In the forward operation, the drive gear of a drive shaft actuates the driven gear. However, the driven gear does not transmit directly the power to a driven shaft. The transmission of the power is instead carried out by a wheel hub capable of axial engagement and disengagement. In another words, the wheel hub acts as a transmission medium. When a reverse operation of the driven shaft is called for, another set of three transmission gears is involved such that an idle gear is in operation to cause the driven gear to turn in the opposite direction. In the meantime, the driven gear does not impart directly the power to the driven shaft. Instead, the wheel hub is engaged with the driven gear so as to actuate the driven shaft. In the case of a prior art reverse gear device, the driven gear of the reverse set is united with a wheel hub capable of moving axially to engage or disengage. It is therefore readily apparent that the conventional reverse gear devices described above are large in volume and complicated in operation. Both the forward operation and the reverse operation of the conventional gear devices call for the engagement of two sets of gears, thereby resulting in mechanical wear, noise, and an increase in power loading. As a result, the engine of the motor scooter is vulnerable to damage and oil leak. In addition, the conventional reverse gear devices cannot be maintained economically.

BRIEF SUMMARY OF THE INVENTION

The primary objective of the present invention is to provide a combined variable transmission system with a reverse gear device which is simple in construction, small in volume, and easy in maintenance. The reverse gear device comprises a drive bevel gear, a driven bevel gear, an idle bevel gear, an idle gear shaft, two shifting forks, and a sector plate cam. The drive bevel gear and the driven bevel gear are identical in specification with each other and are mounted respectively on two ends of a rear wheel axle on the basis of a toothed cone center. The drive bevel gear and the driven bevel gear are provided with a groove facing the center axis of the toothed cone. The drive bevel gear is mounted on the axle by means of a spline hole, while the driven bevel gear is mounted on the axle by means of a round hole, so as to facilitate the transmission of power in the usual forward motion. The idle bevel gear is smaller than the drive bevel gear and is mounted over the toothed cone center (right angle pitch of the center line of the axle). When the driven bevel gear is engaged in the reverse direction, the drive bevel gear and the idle bevel gear are actuated to displace by the sector plate cam and the two shifting forks, thereby resulting in engagement of the three bevel gears. The reverse motion is attained by the participation of the idle bevel gear in the change in the direction in which the driven bevel gear turns.

The features and the advantages of the present invention will be more readily understood upon a thoughtful deliberation of the following detailed description of the present invention with reference to the accompanying drawings.

DETAILED DESCRIPTION OF THE INVENTION

Figure 1:
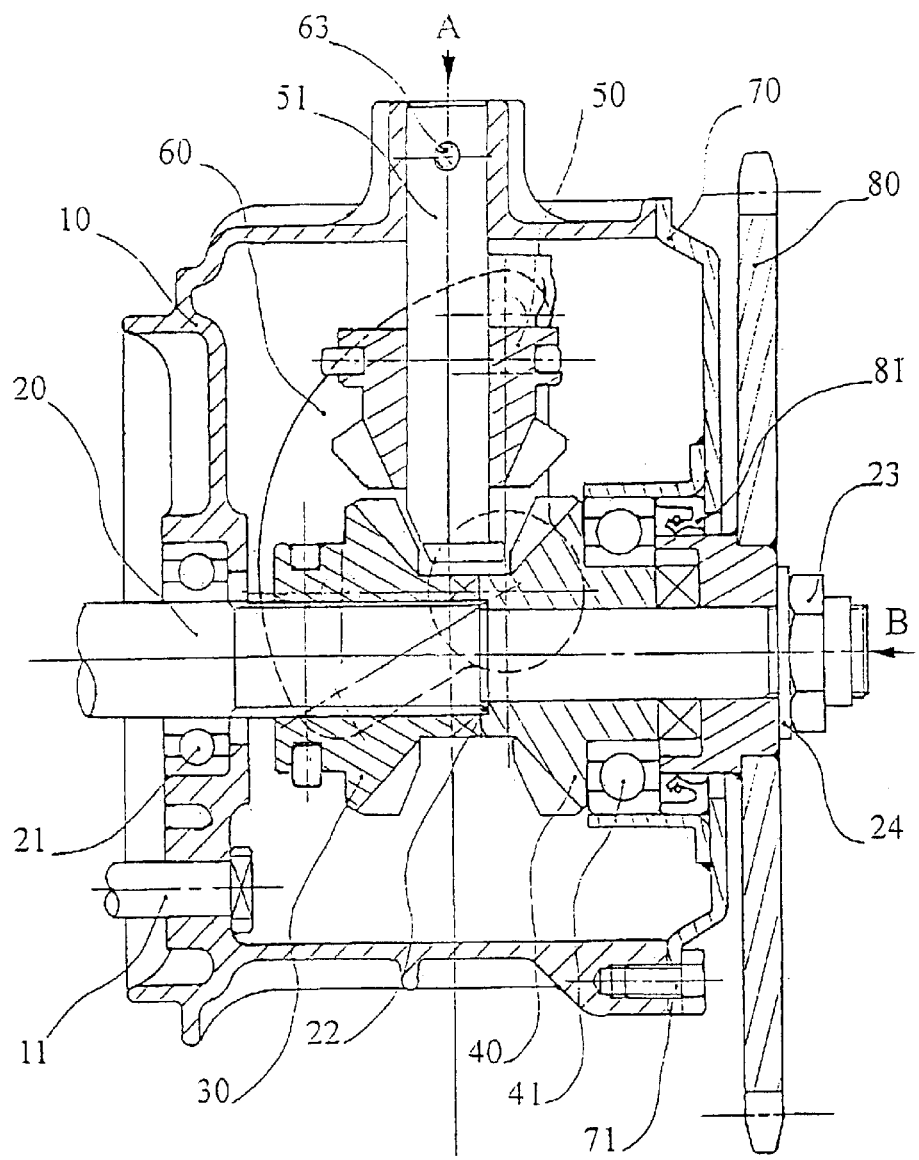
FIG. 1 shows a sectional schematic view of a forward gear of the present invention.
Figure 2:
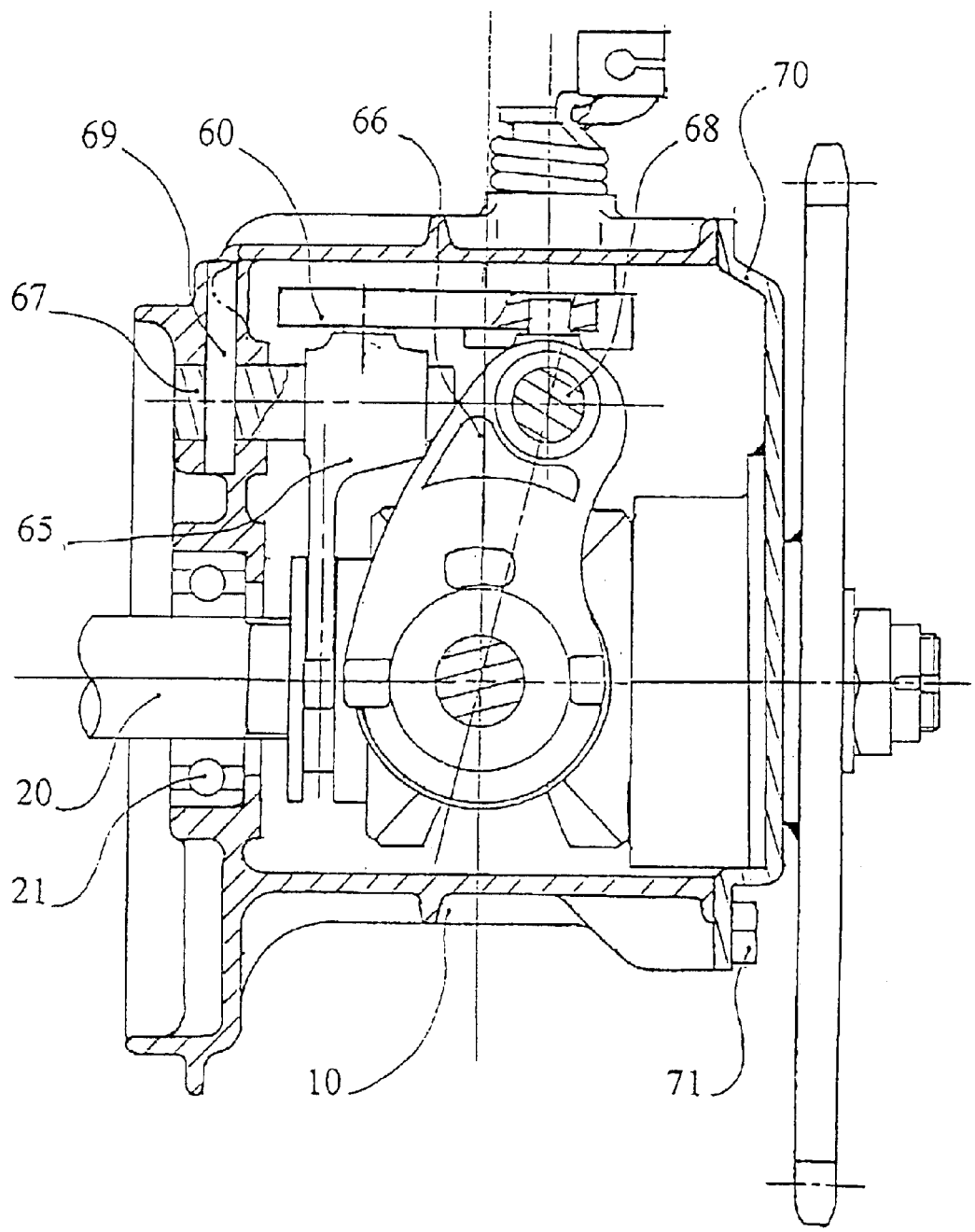
FIG. 2 shows a sectional schematic view of a portion taken along a direction indicated by an arrow "A" in FIG. 1.
Figure 3:
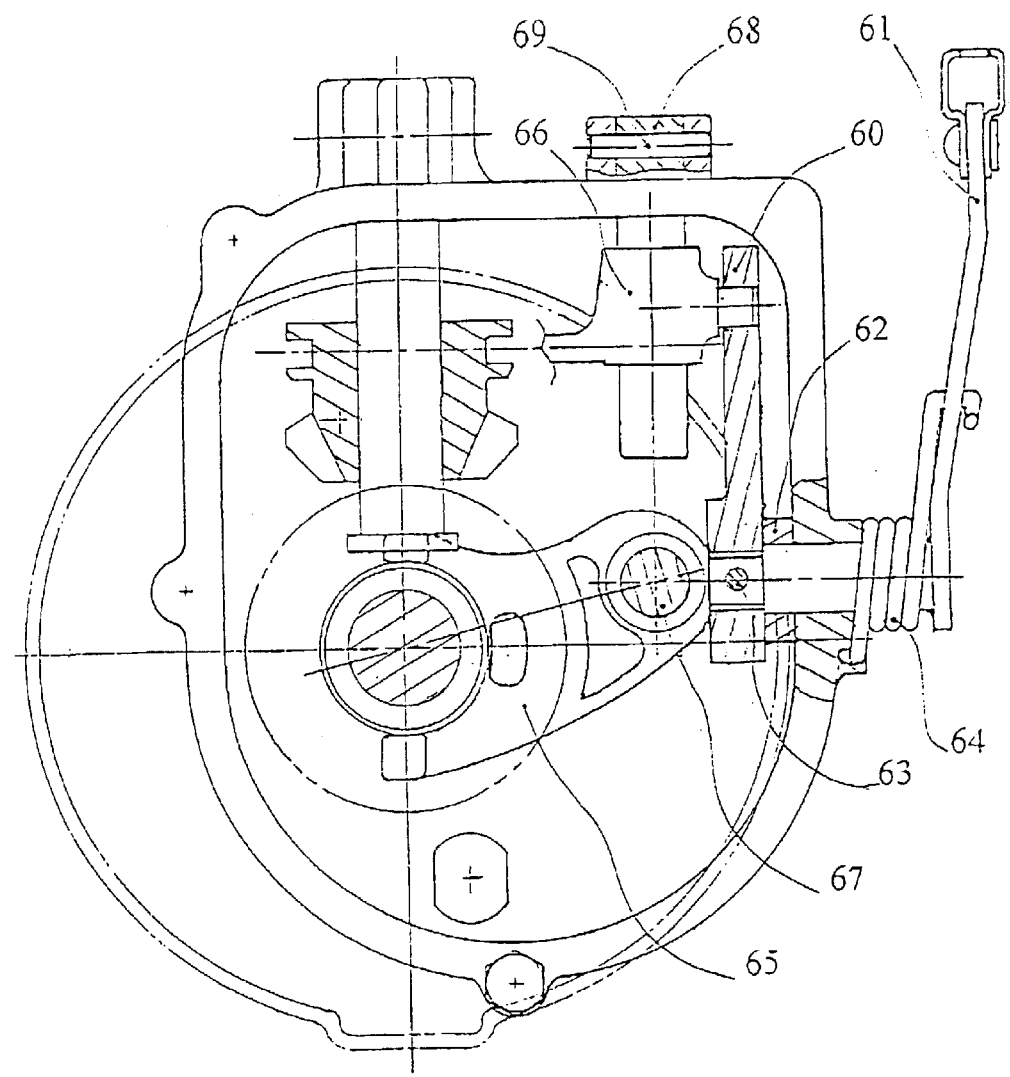
FIG. 3 shows a sectional schematic view of a portion taken along a direction indicated by an arrow "B" in FIG. 1.

As shown in FIGS. 1–3, the forward gear of the present invention comprises a housing 10, a bolt 11, a rear wheel axle 20, a bearing 21, a thrust washer 22, a drive bevel gear 30, a driven bevel gear 40, a bearing 41, an idle bevel gear 50, an idle gear shaft 51, a sector plate cam 60, a rocking arm 61, a thrust washer 62, a fastening pin 63, a torsion spring 64, a first shifting fork 65, a second shifting fork 66, a first shaft 67, a second shaft 68, a fastening pin 69, a cover 70, a bolt 71, a power output sprocket 80, an oil seal 81, a nut 23, and a washer 24.

The housing 10 is mounted on the rear wheel axle 20 of a motor scooter and is used to contain the drive bevel gear 30 and other components.

Figure 5:
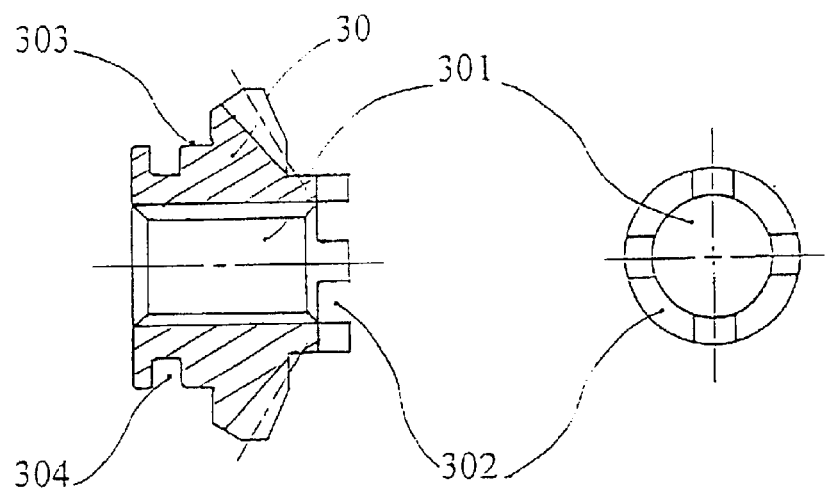
FIG. 5 shows a front sectional view and a side schematic view of the drive bevel gear of the present invention.

As shown in FIG. 5, the drive bevel gear 30 is provided in the axial center with a spline hole 301 for use in joining with the rear wheel axle 20 and for use in the axial movement. The drive bevel gear 30 is provided with a radial groove 302 facing the toothed cone center for use in engaging the driven bevel gear 40 in the forward motion. The drive bevel gear 30 is further provided with a reverse end 303 of a toothless cylindrical construction, and a ring-shaped groove 304 for engaging the first shifting fork 65 in the axial movement.

Figure 6:
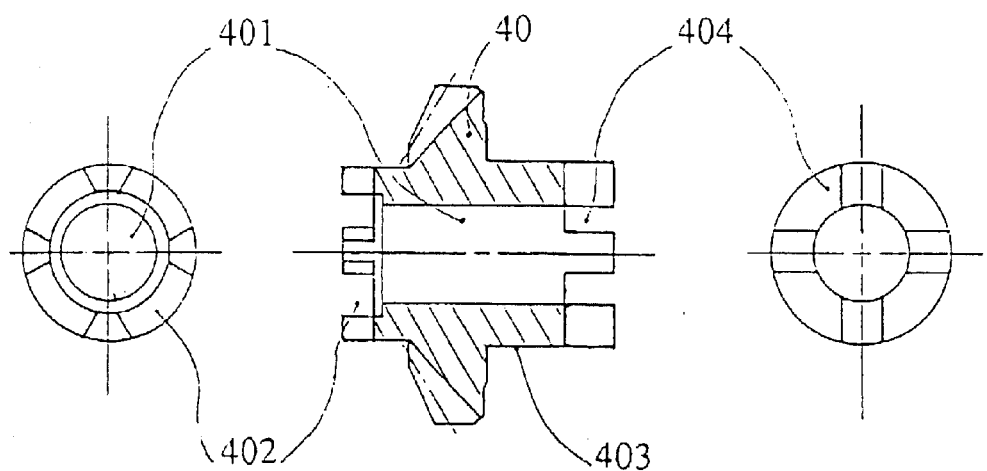
FIG. 6 shows a front sectional view and two side schematic views of the driven bevel gear of the present invention.

As shown in FIG. 6, the driven bevel gear 40 is identical in specification with the drive bevel gear 30 and is provided in the axial center with a round hole 401 for supporting the rear wheel axle 20 in idling. The driven bevel gear 40 is provided with a radial groove 402 facing the toothed cone center for use in engaging with the radial groove 302 of the drive bevel gear 30 in the forward motion. The driven bevel gear 40 is further provided with a reverse end 403 of a toothless cylindrical construction, and in the axial end with a radial groove 404 for use in engaging a power output sprocket 80.

Figure 7:
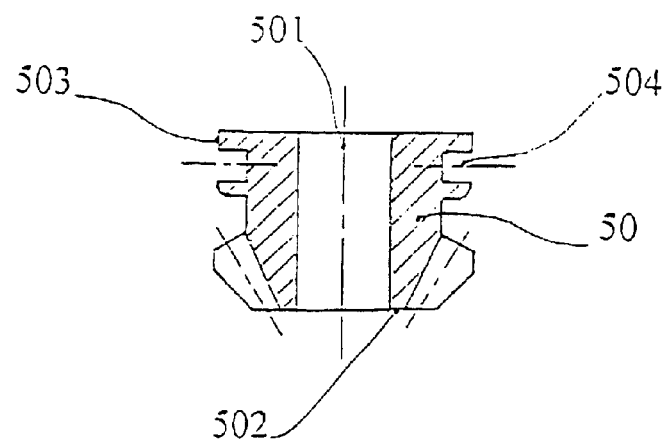
FIG. 7 shows a front sectional view of the idle bevel gear of the present invention.

As shown in FIG. 7, the idle bevel gear 50 is smaller in specification than the drive bevel gear 30 and is mounted at an appropriate place of the center line right angle pitch of the rear wheel axle 20. In another words, the idle wheel gear 50 is located over the position at which the drive bevel gear 30 and the driven bevel gear 40 are in the toothed cone center standard engagement. The idle bevel gear 50 is provided in the axial center with a round hole 501 and is supported by an idle gear shaft 51. The idle bevel gear 50 is further provided with a planar surface 502 facing the toothed cone center, a reverse end 503 of a toothless cylindrical construction, and a ring-shaped groove 504 for engaging the second shifting fork 66 in the axial movement. The idle gear shaft 51 is fastened with the housing 10 by a fastening pin 63 and is used to support the idle bevel wheel 50.

Figure 4:
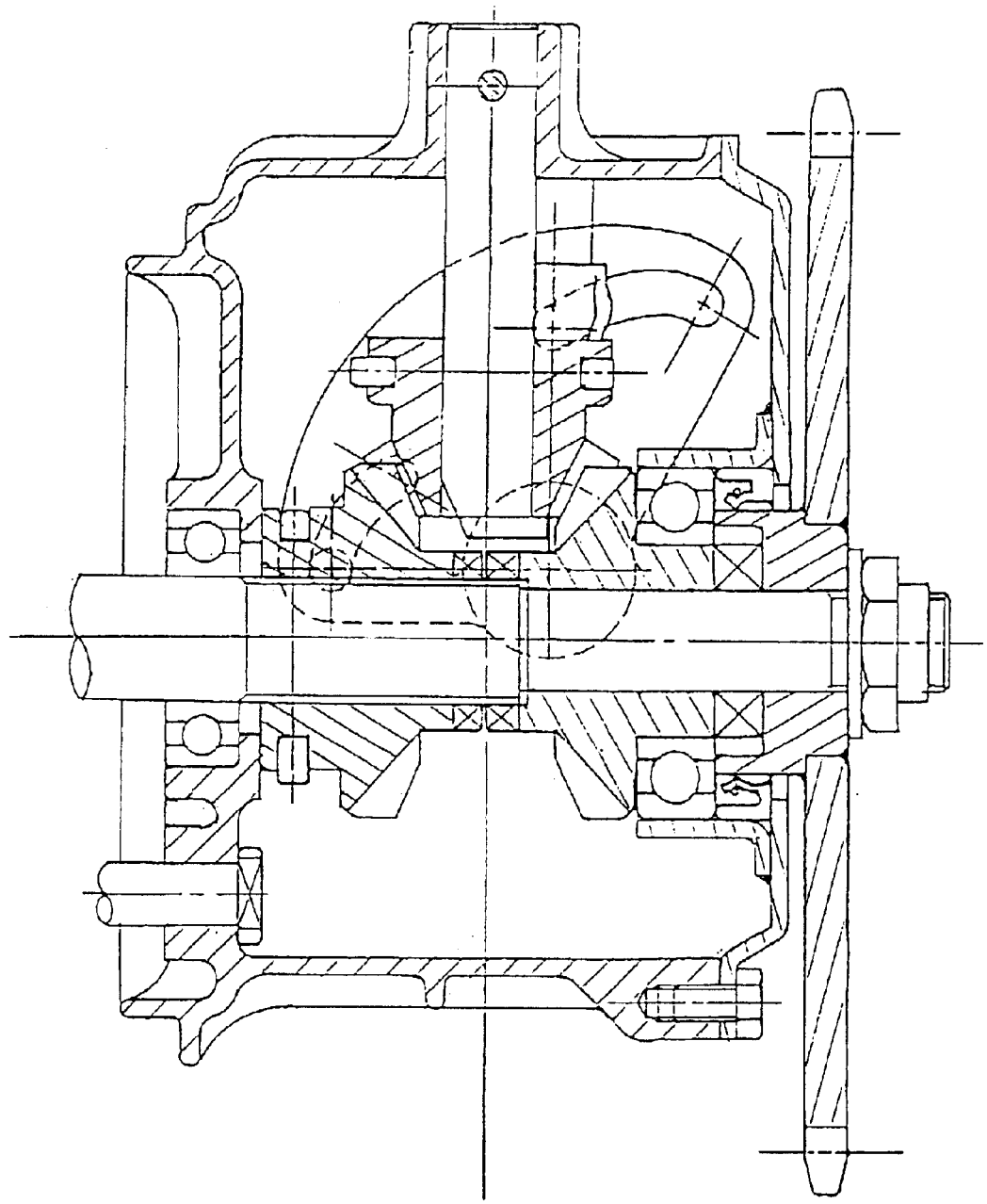
FIG. 4 shows a sectional schematic view of a reverse gear of the present invention.
Figure 8:
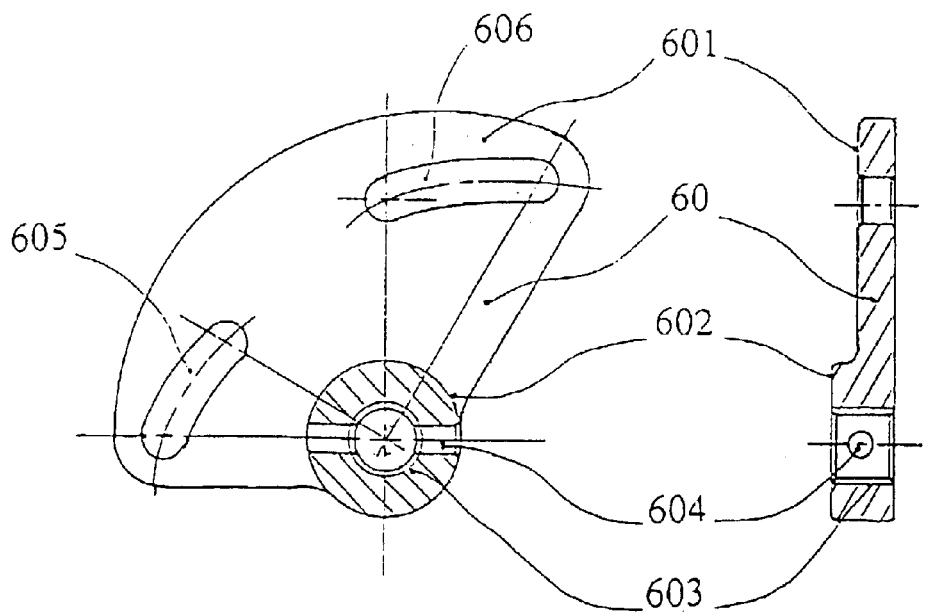
FIG. 8 shows a front view and a side sectional view of the sector plate cam of the present invention.
Figure 9:
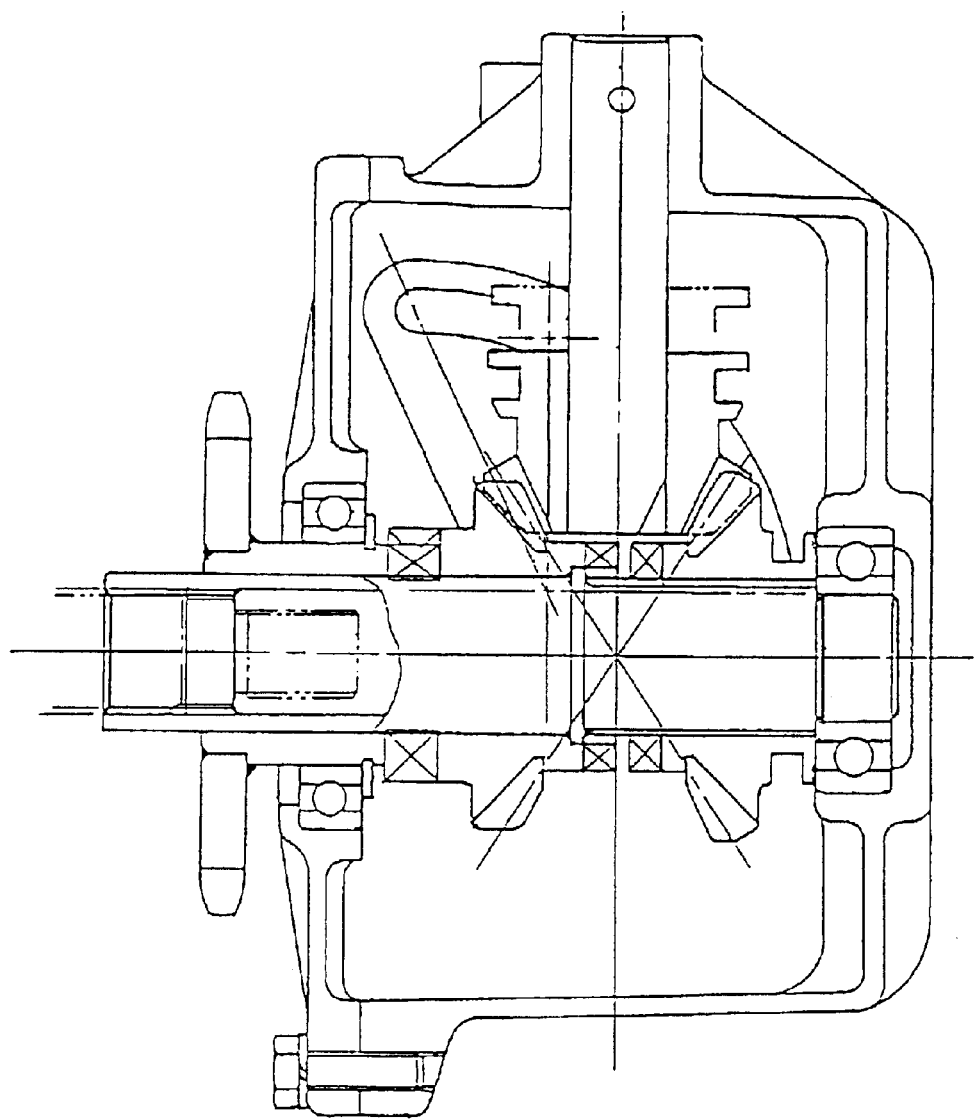
FIG. 9 shows a sectional schematic view of another preferred embodiment of the present invention.

As shown in FIG. 8, the sector plate cam 60 has a sector surface 601 which is provided at the center thereof with a cylindrical projection 602. The sector plate cam 60 is provided in the axial center with a spline through hole 603, and a pin hole 604 located at the center right angle pitch thereof for receiving the pin 63 which is used to fasten the rocking arm 61 with the sector plate cam 60. The sector plate cam 60 is further provided in proximity of sectorial edge with two curved grooves 605 and 606 for use in placing the guide pins of the first shifting fork 65 and the second shifting fork 66 and for enabling the guide pins of the first shifting fork 65 and the second shifting fork 66 to displace along the curved grooves 605 and 606 at the time when the sector plate cam 60 is turned, thereby actuating the drive bevel gear 30 and the idle bevel gear 50 so as to enable these three bevel gears to constitute a standard engagement position at which they share the same toothed cone center, as shown in FIG. 4. The direction in which the driven bevel gear 40 and the power output sprocket 80 turn can be thus changed. The first shifting fork 65 and the second shifting fork 66 are the prior art devices which are used in the engine of a motorcycle. The shifting forks 65 and 66 are used to move the drive bevel gear 30 and the idle bevel gear 50 respectively. The shifting forks 65 and 66 are capable of an axial movement respectively on the first shaft 67 and the second shaft 68 and are fastened with the housing 10 by a fastening pin 69.

The reverse gear device of the present invention is mounted at the rear wheel axle position of a motor scooter such that the housing of the present invention contains three bevel gears. The angle of the dwelling position of the sector plate cam is changed by means of the rocking arm in conjunction with two curved grooves of the sector plate cam. The drive bevel gear and the idle bevel gear are moved by the two shifting forks, so as to enable the three bevel gears to form the standard engagement position. In light of the participation of the idle bevel gear in the reverse motion, the device of the present invention is simple in construction, small in volume, and easy in maintenance. The device of the present invention is free from the shortcomings of the conventional reverse gear device and is therefore suitable for use in a three-wheeled motor scooter which is designed for a physically-handicapped person.

The embodiment of the present invention described above is to be regarded in all respects as being illustrative and nonrestrictive. Accordingly, the present invention may be embodied in other specific forms without deviating from the spirit thereof. The present invention is therefore to be limited only by the scope of the following claims.

What is claimed is:

1. A reverse gear device of a combined variable transmission system, said reverse gear device comprising:

a drive bevel gear and a driven bevel gear identical in specification with said drive bevel gear, said drive bevel gear and said driven bevel gear being mounted at two sides of a rear wheel axle on the basis of a toothed cone center and provided with a groove facing the toothed cone center, said drive bevel gear being disposed with said rear wheel axle by a spline hole, said driven bevel gear being disposed with said rear wheel axle by a round hole, so as to facilitate a power transmission in a forward motion;

an idle bevel gear mounted over the toothed cone center (an axial center line right angle pitch) of said drive bevel gear and said driven bevel gear, said idle bevel gear and said drive bevel gear being actuated by a sector plate cam and two shifting forks to displace at the time when said driven bevel gear is to engage in a reverse motion, thereby enabling said drive bevel gear, said driven bevel gear and said idle bevel gear to constitute a standard engagement position so as to change a rotating direction of said driven bevel gear;

wherein said groove of said drive bevel gear is engaged with said groove of said driven bevel gear in the forward motion;

wherein said drive bevel gear and said driven bevel gear are disengaged with each other so as to enable said drive bevel gear, said driven bevel gear and said idle bevel gear to constitute the standard engagement position to facilitate executing of a reverse motion;

wherein said sector plate cam is provided in proximity of a sectorial edge thereof with two curved grooves for receiving guide pins of said two shifting forks such that said guide pins displace along said curved grooves at the time when said sector plate cam is turned to enable said shifting forks to move said drive bevel gear and said idle bevel gear, thereby resulting in an engaging process or a disengaging process to bring about a change in the rotating direction.

* * * * *